(12) United States Patent
Santiago et al.

(10) Patent No.: US 12,350,908 B2
(45) Date of Patent: Jul. 8, 2025

(54) LIGHTWEIGHT NANOPARTICLE COMPOSITION FOR A PROTECTIVE APPARATUS AND METHOD OF MAKING

(71) Applicant: Technology Innovation Institute—Sole Proprietorship LLC, Masdar (AE)

(72) Inventors: Rafael Celeghini Santiago, Abu Dhabi (AE); Monserrat Gutierrez, Abu Dhabi (AE); Haleimah Al Abdouli, Abu Dhabi (AE); Abdulla AlShehhi, Abu Dhabi (AE); Zhongwei Guan, Abu Dhabi (AE)

(73) Assignee: Technology Innovation Institute—Sole Proprietorship LLC, Masdar (AE)

( * ) Notice: Subject to any disclaimer, the term of this patent is extended or adjusted under 35 U.S.C. 154(b) by 0 days.

(21) Appl. No.: 18/366,232

(22) Filed: Aug. 7, 2023

(65) Prior Publication Data

US 2024/0208189 A1    Jun. 27, 2024

(30) Foreign Application Priority Data

Aug. 7, 2022 (AE) .......................... P6001532/2022

(51) Int. Cl.
*B32B 27/08* (2006.01)
*B32B 9/00* (2006.01)
(Continued)

(52) U.S. Cl.
CPC .............. *B32B 27/08* (2013.01); *B32B 9/005* (2013.01); *B32B 27/32* (2013.01); *B63G 9/00* (2013.01);
(Continued)

(58) Field of Classification Search
CPC ......... B32B 9/005; B32B 27/32; B32B 27/08; B32B 2255/10; B32B 2323/043;
(Continued)

(56) References Cited

U.S. PATENT DOCUMENTS 7,226,878 B2   6/2007   Wagner et al.
7,498,276 B2   3/2009   Wagner et al.
(Continued)

FOREIGN PATENT DOCUMENTS

CZ           26200        12/2013
KR   10-2016-0079189      7/2016
(Continued)

OTHER PUBLICATIONS

PCT International Application No. PCT/IB23/57957, International Search Report and Written Opinion of the International Searching Authority, dated Oct. 17, 2023, 12 pages.
(Continued)

*Primary Examiner* — Samir Abdosh
(74) *Attorney, Agent, or Firm* — DLA PIPER LLP (US)

(57) ABSTRACT

The present disclosure describes articles that may be used in protective gear, including but not limited to body armor, helmets, shields, or barriers. These articles may include a polymeric material coated with nanoparticles, in a single layer or in multiple layers, which are treated to form a composite. The articles may further include a ceramic layer and/or a back-face layer. Such articles may be useful for protecting an object or wearer against projectiles.

9 Claims, 4 Drawing Sheets

(51) Int. Cl.
B32B 27/32 (2006.01)
B63G 9/00 (2006.01)
B64D 7/00 (2006.01)
B64G 1/52 (2006.01)
C08J 7/06 (2006.01)
F41H 1/02 (2006.01)
F41H 5/04 (2006.01)
F41H 5/08 (2006.01)
F41H 7/00 (2006.01)

(52) U.S. Cl.
CPC ............ *B64D 7/00* (2013.01); *B64G 1/52* (2013.01); *C08J 7/06* (2013.01); *F41H 1/02* (2013.01); *F41H 5/0428* (2013.01); *F41H 5/08* (2013.01); *F41H 7/00* (2013.01); *B32B 2255/10* (2013.01); *B32B 2323/043* (2013.01); *C08J 2323/06* (2013.01)

(58) Field of Classification Search
CPC ...... B64D 7/00; B64G 1/52; C08J 7/06; C08J 2323/06; F41H 1/02; F41H 5/0428; F41H 5/08; F41H 7/00
USPC ........................................................ 89/36.01
See application file for complete search history.

(56) References Cited

U.S. PATENT DOCUMENTS

| | | | |
|---|---|---|---|
| 7,825,045 B1 | 11/2010 | Wagner et al. | |
| 8,176,830 B1 * | 5/2012 | Tan | F41H 5/0428 89/917 |
| 8,408,114 B1 * | 4/2013 | Tan | F41H 5/08 89/36.02 |
| 8,637,169 B2 * | 1/2014 | Van Nutt | B32B 15/20 428/688 |
| 2005/0266748 A1 * | 12/2005 | Wagner | B32B 5/026 442/168 |
| 2006/0234577 A1 | 10/2006 | Wagner et al. | |
| 2010/0165276 A1 * | 7/2010 | David | B32B 37/02 977/773 |
| 2010/0178512 A1 * | 7/2010 | Giesenberg | C08F 2/48 977/773 |
| 2010/0269236 A1 | 10/2010 | Wagner et al. | |
| 2014/0113086 A1 * | 4/2014 | Greenhill | F41H 1/04 428/323 |
| 2015/0237929 A1 * | 8/2015 | Greenhill | F41H 1/08 428/688 |
| 2016/0118157 A1 * | 4/2016 | Holesinger | B32B 15/20 72/274 |
| 2016/0200882 A1 * | 7/2016 | Bhat | B32B 5/022 442/327 |
| 2016/0221303 A1 * | 8/2016 | Jancar | B32B 7/02 |
| 2017/0022412 A1 * | 1/2017 | Qiu | C09K 11/70 |
| 2017/0153089 A1 | 6/2017 | Bahu et al. | |
| 2023/0279262 A1 * | 9/2023 | Kourtakis | C09D 179/08 |
| 2024/0336754 A1 * | 10/2024 | Yao | C09D 7/45 |

FOREIGN PATENT DOCUMENTS

| | | |
|---|---|---|
| WO | 2013008178 | 1/2013 |
| WO | 2022112312 | 6/2022 |

OTHER PUBLICATIONS

Cao, "Smart coatings for protective clothing," Active coatings for smart textiles, 2016, pp. 375-389.

Tam, et al., "High-performance ballistic protection using polymer nanocomposites," Advances in military textiles and personal equipment, Woodhead Publishing, 2012, pp. 213-237.

International Search Report of AE Application No. P6001532/2022, mailed May 20, 2024, 8 pages.

* cited by examiner

FIG. 4

LIGHTWEIGHT NANOPARTICLE COMPOSITION FOR A PROTECTIVE APPARATUS AND METHOD OF MAKING

CROSS-REFERENCE TO RELATED APPLICATIONS

This application claims priority to United Arab Emirates Patent Application No. P6001532/2022, which was filed on Aug. 7, 2022, and is hereby incorporated by reference herein in its entirety.

FIELD

The present disclosure relates generally to articles for and methods of producing protective apparatuses that provide lightweight ballistic protection. More specifically, the present disclosure relates to nanoparticle coated polymers which provide ballistic protection against projectiles.

BACKGROUND

Protective gear that is impenetrable to ballistic strikes is relevant in military and security applications. In addition to offering individual protection in the form of body armor and protective headgear, ballistic panels and layers may be applied to vehicles and water- or aircraft to prevent damage to these vessels from ballistic strikes.

The materials employed for ballistic-level protective gear include woven and non-woven fabrics, laminates, and composites which may contain polymers, ceramics, metals, and other components. While materials such as wood and metals offer varying degrees of protection against projectiles, depending on the thickness of the material and the size of the projectile, the weight of these materials make them unideal for protective equipment. It is particularly important that body armor be lightweight and allow the user to move freely. As such, lightweight protective materials are of particular value.

Combinations of materials have been developed to allow protection from ballistic strikes without adding weight. One such example is the use of shear-thickening fluids, which increase in viscosity as a function of applied stress. Shear-thickening fluids can be applied to existing body armor materials to improve their strength and allow a thinner material to be used, which reduces weight. However, while this strategy is effective for producing protective gear that is stab-resistant and provides some degree of protection from low-caliber projectiles, there remains a need for lightweight materials that are effective against high-powered projectiles.

SUMMARY

In some embodiments, there is provided an article for a protective apparatus, including: at least one layer of a polymeric material coated with 0.1 wt. % to 10 wt. % of nanoparticles, wherein the article has an areal density of at most 40.0 kg/m² and exhibits a back-face signature of at most 44 mm when struck with a 7.62×51 mm NATO projectile.

In some embodiments, the polymeric material includes polyethylene, ultra-high molecular weight polyethylene, polypropylene, para-aramid, polyether ether ketone, polyaryletherketone, polyepoxide, or combinations thereof.

In some embodiments, the nanoparticles according to any of the above embodiments include carbon nanotubes, graphene, silicon dioxide, boron nitrite, or combinations thereof.

In some embodiments, the article according to any of the above embodiments includes multiple layers of a polymeric material coated with 0.1 wt. % to 10 wt. % of nanoparticles.

In some embodiments, the article according to any of the above embodiments is 5 mm to 100 mm thick.

In some embodiments, the article according to any of the above embodiments further includes a ceramic layer.

In some embodiments, the article according to any of the above embodiments further includes a back-face layer.

In some embodiments, the article according to any of the above embodiments further includes a ceramic layer and a back-face layer.

In some embodiments, the article according to any of the above embodiments includes at least one layer of ultra-high molecular weight polyethylene coated with 0.1 wt. % to 10 wt. % of carbon nanotubes.

In some embodiments, the article according to any of the above embodiments includes at least two layers of a polymer coated with about 0.1 wt. % to 10 wt. % of nanoparticles.

In some embodiments, the article according to any of the above embodiments includes at least five layers of a polymer coated with about 0.1 wt. % to 10 wt. % of nanoparticles.

In some embodiments, the article according to any of the above embodiments has an areal density of at most 25.0 kg/m².

In some embodiments, there is provided a method for producing a composite for a protective apparatus, including steps of: providing a polymeric material, coating the polymeric material with nanoparticles using a coating method to produce a coated polymeric sheet, and treating the coated polymeric sheet using a treatment method to form a composite, wherein the composite has an areal density of at most 40.0 kg/m² and exhibits a back-face signature of at most 44 mm when struck with a 7.62×51 mm NATO projectile.

In some embodiments, the polymeric material includes polyethylene, ultra-high molecular weight polyethylene, polypropylene, para-aramid, polyether ether ketone, polyaryletherketone, polyepoxide, or combinations thereof.

In some embodiments, the nanoparticles according to any of the above embodiments include carbon nanotubes, graphene, silicon dioxide, boron nitrite, or combinations thereof.

In some embodiments, the coating method according to any of the above embodiments includes spray coating, drop casting, or combinations thereof.

In some embodiments, the method according to any of the above embodiments includes stacking a plurality of coated polymeric sheets and treating the plurality of coated polymeric sheets using a treatment method to form a composite.

In some embodiments, the treatment method according to any of the above embodiments includes hot pressing the coated polymeric sheet at a temperature of 100° C. to 400° C. and a pressure of 100 bar to 400 bar.

In some embodiments, the treatment method according to any of the above embodiments includes hot pressing the coated polymeric sheet at a temperature of 100° C. to 150° C. and a pressure of 120 bar to 280 bar.

In some embodiments, the method according to any of the above embodiments further includes applying a ceramic layer to a front side of the composite.

In some embodiments, the method according to any of the above embodiments further includes applying a back-face layer to a rear side of the composite.

In some embodiments, the method according to any of the above embodiments further includes applying a ceramic layer to a front side of the composite and a back-face layer to a rear side of the composite.

In some embodiments, there is provided a method for protecting an object against a ballistic strike, including steps of: applying an article to the object, wherein the article includes: at least one layer of a polymer coated with 0.1 wt. % to 10 wt. % of nanoparticles, wherein the article has an areal density of at most 40.0 kg/m$^2$.

In some embodiments, the polymeric material includes polyethylene, ultra-high molecular weight polyethylene, polypropylene, para-aramid, polyether ether ketone, polyaryletherketone, polyepoxide, or combinations thereof.

In some embodiments, the nanoparticles according to any of the above embodiments include carbon nanotubes, graphene, silicon dioxide, boron nitrite, or combinations thereof.

In some embodiments, the article according to any of the above embodiments includes at least two layers of a polymer coated with 0.1 wt. % to 10 wt. % of nanoparticles.

In some embodiments, the article according to any of the above embodiments includes at least five layers of a polymer coated with 0.1 wt. % to 10 wt. % of nanoparticles.

In some embodiments, the article according to any of the above embodiments includes at least one layer of ultra-high molecular weight polyethylene coated with 0.1 wt. % to 10 wt. % of carbon nanotubes.

In some embodiments, the article according to any of the above embodiments further includes a ceramic layer applied to a front side of the article.

In some embodiments, the article according to any of the above embodiments further includes a back-face layer applied to a back side of the article.

In some embodiments, the article according to any of the above embodiments further includes a ceramic layer and a back-face layer.

In some embodiments, the object according to any of the above embodiments includes body armor, protective apparel, a vehicle, a watercraft, an aircraft, a spacecraft, a protective shield or barrier, or combinations thereof.

BRIEF DESCRIPTION OF THE DRAWINGS

Aspects, features, benefits, and advantages of the embodiments described herein will be apparent with regard to the following description, appended claims, and accompanying drawings where:

DETAILED DESCRIPTION

The present disclosure describes articles that may be used in protective gear, including but not limited to body armor, helmets, shields, or barriers. These articles may include a composite material, which may include a polymeric material coated with nanoparticles, in a single layer or in multiple layers. Treatment methods may include heating, applying pressure, or combinations thereof. When additional resistance to penetration of the protective apparatus is required, the article may also include a high hardness ceramic layer on the outside of the composite that forms a hard external shell of the protective apparatus. In some embodiments, a soft back-face layer may also be included, such that said back-face layer may absorb or diffuse some of the force of an impact rather allowing the force of the impact to pass on to the user of the article. The structure and material of the composite and optional ceramic and back-face layers produce a lightweight protective apparatus that is resistant to penetration with projectiles. The articles of the present disclosure may be used on their own as a protective apparatus, or may be applied to an existing protective apparatus to provide further protection.

The following terms may be used throughout the present disclosure. Unless otherwise specified, terms used herein should be given their common meaning as would be understood by one of ordinary skill in the art.

As used herein, the term "projectile" refers to any caliber of ammunition that is equivalent to 7.62×51 mm and 7.62×51 mm armor piercing NATO projectiles, or ammunition having equivalent or lower force upon impact. Such projectiles include but are not limited to ammunition from 9 mm and 0.40 S&W ammunition from short-barrel handguns, 9 mm and 0.357 Magnum rounds from short-barrel handguns, 9 mm full metal jacket (FMJ) and 0.44 Magnum rounds from long barrel handguns, and 7.62 mm FMJ lead core rifle ammunition. One skilled in the art will recognize that 7.62×51 mm NATO rounds may be used in weapons including but not limited to M14 rifles, M60 machine guns, M24 sniper rifles, and M240 medium machine guns. A projectile as referred to herein may also include thrown or launched knives, throwing stars, arrows, rubber bullets, or any other object that may be propelled towards a target with a force that is approximately equal to or less than that of 7.62×51 mm NATO ammunition. It will be further understood by those skilled in the art that projectiles of this caliber typically travel at a velocity of about 847±9.1 m/s, and thus the articles of the present disclosure may protect against projectiles having the same or lower kinetic energy.

As used herein, mention of NIJ Standards refer to the National Institute of Justice standards for protective equipment as understood at the time of disclosure. Future updates to the NIJ Standards or other industry standards are not intended to limit the scope of this disclosure. In particular, this disclosure makes reference to NIJ Standard 0101.06 Level III, which is incorporated by reference herein in its entirety and refers to armor or protective gear that has been tested against 7.62×51 mm NATO rounds. It will be understood by those skilled in the art that articles capable of providing protection against 7.62×51 mm NATO rounds will also be capable of providing protection against projectiles with equivalent or lower kinetic energy than 7.62×51 mm NATO rounds.

As used herein, the term "back-face signature" refers to the amount of deformation that may be observed or detected on the rear of a protective apparatus when a projectile strikes the protective apparatus from the front. Back-face signature is the greatest extent of indentation in the backing material caused by a non-perforating impact and is measured in mm. For example, when an article is struck by a projectile but is not fully perforated, the article will often have an indentation at the place of impact. The depth of deformation in the article is measured and is referred to as the back-face signature.

As used herein, "a front side" refers to a side of the article which would be contacted with a projectile; that is, an external side. As used herein, "a back side" or "a rear side"

both refer to a side of an article which would be in contact with a wearer or object to be protected; that is, the side of the article which is not contacted by a projectile.

Figure 1:
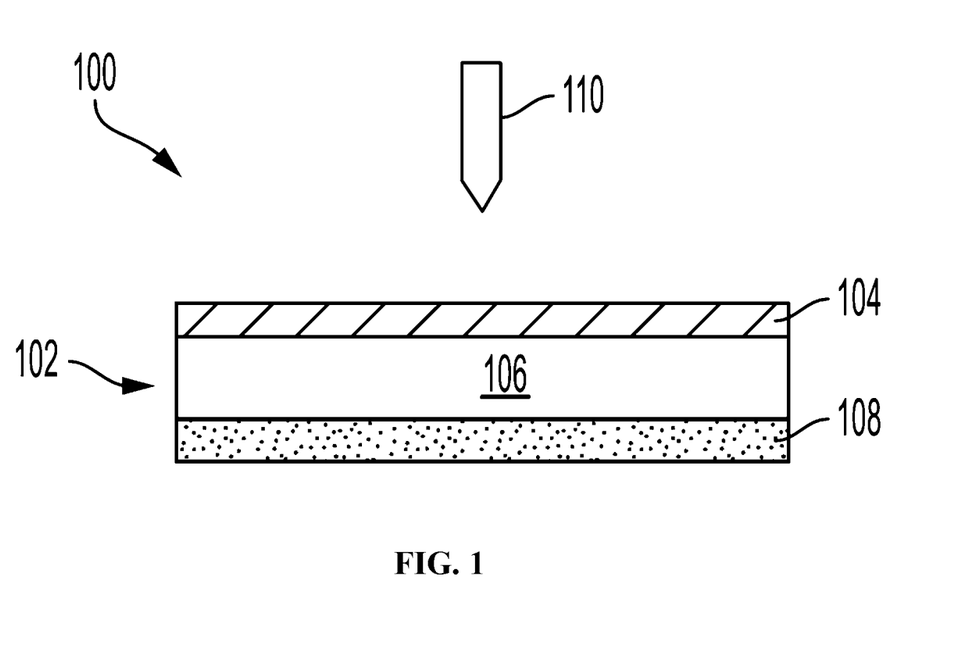
FIG. 1 is an illustrative diagram of an article and an oncoming projectile according to an embodiment of the present disclosure.

FIG. 1 shows an illustrative diagram of an article and an oncoming projectile according to an embodiment of the present disclosure. An article 102 may include a high strength layer 106. As a part of article 102, there may optionally be included a ceramic layer 104 and a back-face layer 108. The article 102 may protect against an oncoming projectile 110. When the high strength layer 106 is used in combination with one of more of the ceramic layer 104 and the back-face layer 108, the article is arranged such that the ceramic layer 104 is positioned on the exterior of the article 102 and the back-face layer 108 is positioned on the interior of the article 102. In some embodiments, the article 102 may include the high strength layer 106 alone. In some embodiments, the article 102 may include the ceramic layer 104 and the high strength layer 106, or the high strength layer 106 and the back-face layer 108. In some embodiments, the article 102 may include the ceramic layer 104, the high strength layer 106, and the back-face layer 108.

The dimensions of article 102 are not particularly limited and may be adapted to suit the needs of a user of the article 102. The dimensions of article 102 may be about 100 mm to about 1000 mm in length by about 100 mm to about 1000 mm in width when article 102 is used in applications such as body armor or personal protective equipment, such as an individual shield. For example, the length of the article 102 may be about 100 mm to about 1000 mm, such as about 100 mm, about 150 mm, about 200 mm, about 250 mm, about 300 mm, about 350 mm, about 400 mm, about 450 mm, about 500 mm, about 550 mm, about 600 mm, about 650 mm, about 700 mm, about 750 mm, about 800 mm, about 850 mm, about 900 mm, about 950 mm, about 1000 mm, or any range formed from any combination of the foregoing values any value or range contained therein. For example, the width of the article 102 may be greater than or equal to about 100 mm to less than or equal to about 1000 mm, such as about 100 mm, about 150 mm, about 200 mm, about 250 mm, about 300 mm, about 350 mm, about 400 mm, about 450 mm, about 500 mm, about 550 mm, about 600 mm, about 650 mm, about 700 mm, about 750 mm, about 800 mm, about 850 mm, about 900 mm, about 950 mm, about 1000 mm, or any value or range contained therein. It is contemplated that the article 102 may have dimensions of about 1 m to about 10 m in length and about 1 m to about 10 m in width when article 102 is used applications requiring the ballistic protection of vehicles, air- or watercraft, or other larger scale applications. For example, the length and width of article 102 may be about 1 m, about 2 m, about 3 m, about 4 m, about 5 m, about 6 m, about 7 m, about 8 m, about 9 m, about 10 m, or any range formed from any combination of the foregoing values.

The thickness of article 102 may be about 5 mm to about 100 mm depending on the level of ballistic protection that is desired. For example, the thickness of article 102 may be about 5 mm, about 10 mm, about 15 mm, about 20 mm, about 25 mm, about 30 mm, about 35 mm, about 40 mm, about 45 mm, about 50 mm, about 55 mm, about 60 mm, about 65 mm, about 70 mm, about 75 mm, about 80 mm, about 85 mm, about 90 mm, about 95 mm, about 100 mm, or any range formed from any combination of the foregoing values. It is contemplated that the thickness of each individual component of article 102. i.e., the high-strength layer 106, the ceramic layer 104, and the back-face layer 108, may vary, such that the total thickness of article 102 is about 5 mm to about 100 mm, as described above. In some embodiments, the thickness of each individual layer of article 102 may be equal or the thickness of each individual layer may be unequal. In some embodiments, the ceramic layer 104 may have a thickness of about 1 mm to about 10 mm, the high-strength layer 106 may have a thickness of about 10 mm to about 30 mm, and the back-face layer 108 may have a thickness of about 1 mm to about 30 mm. This example is non-limiting and other configurations are also possible.

The areal density of article 102 may be at most about 40.0 kg/m$^2$. For example, in body armor or personal shield applications wherein the article 102 has an area of about 0.1 m$^2$ or smaller, the weight of article 102 may be at most about 4 kg. For example, the areal density of article 102 may be greater than or equal to about 1.0 kg/m$^2$ to less than or equal to about 40.0 kg/m$^2$, such as about 1.0 kg/m$^2$, about 5.0 kg/m$^2$, about 10.0 kg/m$^2$, about 15.0 kg/m$^2$, about 20.0 kg/m$^2$, about 25.0 kg/m$^2$, about 30.0 kg/m$^2$, about 35.0 kg/m$^2$, about 40.0 kg/m$^2$, or any range formed from any combination of the foregoing values.

The high-strength layer 106 is designed to serve as a protective apparatus with resistance to penetration by projectiles while maintaining a relatively light weight. The high-strength layer may stop, deflect, shatter, deform, or otherwise prevent a projectile from penetrating the protective apparatus. Preventing a projectile from penetrating the protective apparatus may include preventing the projectile from causing any damage to the protective apparatus or may include preventing the projectile from passing all the way through the projective apparatus, such that the projectile is stopped at a point within the protective apparatus. The high-strength layer 106 may have sufficient strength to prevent the penetration of projectiles that are equivalent to 7.62×51 mm NATO projectiles, which typically travel at a velocity of about 847±9.1 m/s. It will also be understood that the high-strength layer may have sufficient strength to prevent the penetration of projectiles which have a lower kinetic energy than 7.62×51 mm NATO projectiles. The high strength layer 106 may include a polymeric material, such as polyethylene, ultra-high molecular weight polyethylene (UHMWPE), polypropylene, para-aramid, polyether ether ketone, polyaryletherketone, polyepoxide, or combinations thereof. The high-strength layer 106 may be a plyometric high-strength laminated composite.

The high strength layer 106 may further include a layer of nanoparticles which has been deposited onto the polymeric material. The nanoparticles may include carbon nanotubes, graphene, silicon oxide, boron nitrite, or combinations thereof. The nanoparticles may make up about 0.1 wt. % to about 10 wt. % of the total weight of the high strength layer 106. For example, the high strength layer 106 may include nanoparticles in the amount of about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1.0 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, about 2.0 wt. %, about 2.1 wt. %, about 2.2 wt. %, about 2.3 wt. %, about 2.4 wt. %, about 2.5 wt. %, about 2.6 wt. %, about 2.7 wt. %, about 2.8 wt. %, about 2.9 wt. %, about 3.0 wt. %, about 3.1 wt. %, about 3.2 wt. %, about 3.3 wt. %, about 3.4 wt. %, about 3.5 wt. %, about 3.6 wt. %, about 3.7 wt. %, about 3.8 wt. %, about 3.9 wt. %, about 4.0 wt. %, about 4.1 wt. %, about 4.2 wt. %, about 4.3 wt. %, about 4.4 wt. %, about 4.5 wt. %, about 4.6 wt. %, about 4.7 wt. %, about 4.8 wt. %, about 4.9 wt. %, about 5.0 wt. %, about 5.1 wt. %, about 5.2 wt. %, about 5.3 wt. %, about 5.4 wt. %, about 5.5 wt. %, about 5.6 wt. %, about 5.7 wt. %, about 5.8 wt.

%, about 5.9 wt. %, about 6.0 wt. %, about 6.1 wt. %, about 6.2 wt. %, about 6.3 wt. %, about 6.4 wt. %, about 6.5 wt. %, about 6.6 wt. %, about 6.7 wt. %, about 6.8 wt. %, about 6.9 wt. %, about 7.0 wt. %, about 7.1 wt. %, about 7.2 wt. %, about 7.3 wt. %, about 7.4 wt. %, about 7.5 wt. %, about 7.6 wt. %, about 7.7 wt. %, about 7.8 wt. %, about 7.9 wt. %, about 8.0 wt. %, about 8.1 wt. %, about 8.2 wt. %, about 8.3 wt. %, about 8.4 wt. %, about 8.5 wt. %, about 8.6 wt. %, about 8.7 wt. %, about 8.8 wt. %, about 8.9 wt. %, about 9.0 wt. %, about 9.1 wt. %, about 9.2 wt. %, about 9.3 wt. %, about 9.4 wt. %, about 9.5 wt. %, about 9.6 wt. %, about 9.7 wt. %, about 9.8 wt. %, about 9.9 wt. %, about 10.0 wt. %, or any range formed from any combination of the foregoing values. For example, the high strength layer 106 may include at least one layer of ultra-high molecular weight polyethylene (UHMWPE) coated with about 0.1 wt. % to about 10 wt. % carbon nanotubes. In some embodiments, the nanoparticles include an additive, including but not limited to In some embodiments, the high strength layer 106 is a composite. The high strength layer 106 may include multiple layers of polymeric material coated with nanoparticles which have been attached or fused to form a composite material. Methods for attaching or fusing the layers of polymeric material are not particularly limited and include methods disclosed herein, as well as methods which may be selected by those skilled in the art.

The ceramic layer 104 may be a high hardness layer. The ceramic layer 104 provides the protection and penetration resistance of metal alloys, which are also used in the art, while allowing the protective apparatus to remain lightweight. The ceramic layer 104 is designed to shatter or deform an oncoming projectile and distribute the impact load over a larger area such that the projectile is less likely to penetrate the protective apparatus. In some embodiments, the ceramic layer 104 may be broken or shattered upon impact with the project, while still preventing the penetration of the projectile through the entirety of the protective apparatus. The ceramic layer 104 may be included in article 102 in applications where it is advantageous to shatter oncoming projectiles, where the projectile has a soft core, where further weight reduction is required, or other situations determined by one skilled in the art. For example, ceramic layer 104 may be used in vehicle armor or in protective layers for air- or watercraft, wherein projectile fragments pose little risk and light weight is of critical importance. The ceramic layer 104 may include silicon carbide, silicon nitride, boron carbide, titanium boride, titanium diboride, zirconia, alumina, or other ceramic material known to those skilled in the art.

The length and width of the ceramic layer 104 are not particularly limited and may be adjusted to suit the needs of a user of the article 102. For example, the length of the ceramic layer 104 may be about 100 mm to about 1000 mm, such as about 100 mm, about 150 mm, about 200 mm, about 250 mm, about 300 mm, about 350 mm, about 400 mm, about 450 mm, about 500 mm, about 550 mm, about 600 mm, about 650 mm, about 700 mm, about 750 mm, about 800 mm, about 850 mm, about 900 mm, about 950 mm, about 1000 mm, or any value or range contained therein. For example, the width of the ceramic layer 104 may be about 100 mm to about 1000 mm, such as about 100 mm, about 150 mm, about 200 mm, about 250 mm, about 300 mm, about 350 mm, about 400 mm, about 450 mm, about 500 mm, about 550 mm, about 600 mm, about 650 mm, about 700 mm, about 750 mm, about 800 mm, about 850 mm, about 900 mm, about 950 mm, about 1000 mm, or any range formed from any combination of the foregoing values. It is contemplated that the ceramic layer 104 may have a length and width of about 1 m to about 10 m when ceramic layer 104 is used applications requiring the ballistic protection of vehicles, air- or watercraft, or other larger scale applications. For example, the length and width of ceramic layer 104 may be about 1 m, about 2 m, about 3 m, about 4 m, about 5 m, about 6 m, about 7 m, about 8 m, about 9 m, about 10 m, or any range formed from any combination of the foregoing values. The ceramic layer 104 may cover all of the article 102, or the ceramic layer 104 may cover a portion of the article 102. The ceramic layer 104 may be attached to a front side of the high hardness layer 106.

When a projectile impacts a protective apparatus, even if the projectile does not penetrate the protective apparatus, the force of the impact may result in damage to the protective apparatus or object or injury to the user. The back-face layer 108 is provided to absorb or diffuse some or all of the force of an impact by a projectile. In applications where the protective apparatus is used by a human or animal that may sustain an injury from blunt-force trauma associated with a non-penetrative projectile strike, the back-face layer 108 may be included. In applications where weight reduction and keeping the protective apparatus thin are prioritized, such as when the protective apparatus is used on a vehicle or air- or watercraft, the back-face layer 108 may be omitted. The back-face layer 108 may be soft, flexible, and/or deformable. The back-face layer 108 may include polyurethane foam, thermoplastic polyurethane, polystyrene, polyvinylchloride, polyethylene, acrylonitrile butadiene styrene, rubber, silicone, or combinations thereof.

The length and width of the back-face layer 108 are not particularly limited and may be adjusted to suit the needs of a user of the article 102. For example, the length and width of the back-face layer 108 may be about 100 mm to about 1000 mm, such as about 100 mm, about 150 mm, about 200 mm, about 250 mm, about 300 mm, about 350 mm, about 400 mm, about 450 mm, about 500 mm, about 550 mm, about 600 mm, about 650 mm, about 700 mm, about 750 mm, about 800 mm, about 850 mm, about 900 mm, about 950 mm, about 1000 mm, or any value or range contained therein. For example, the width of the back-face layer 108 may be about 100 mm to about 1000 mm, such as about 100 mm, about 150 mm, about 200 mm, about 250 mm, about 300 mm, about 350 mm, about 400 mm, about 450 mm, about 500 mm, about 550 mm, about 600 mm, about 650 mm, about 700 mm, about 750 mm, about 800 mm, about 850 mm, about 900 mm, about 950 mm, about 1000 mm, or any range formed from any combination of the foregoing values. It is contemplated that the back-face layer 108 may have a length and width of about 1 m to about 10 m when back-face layer 108 is used applications requiring the ballistic protection of vehicles, air- or watercraft, or other larger scale applications. For example, the length and width of back-face layer 108 may be about 1 m, about 2 m, about 3 m, about 4 m, about 5 m, about 6 m, about 7 m, about 8 m, about 9 m, about 10 m, or any range formed from any combination of the foregoing values. The back-face layer 108 may be present as a liner for all of the article 102, or the back-face layer 108 may be present as a liner for a portion of the article 102. The back-face layer 108 may be attached to a rear side of the high hardness layer 106.

In some embodiments, the article of the present disclosure exhibits a back-face signature of at most about 44 mm when struck with a projectile. Back-face signature is a measure of the deformation of an article which has been struck by a projectile. When an article is struck but not fully penetrated by a projectile, the object will often exhibit an indentation or deformation at the place of impact, without wishing to be bound by theory. The depth of the such a deformation, commonly measured in millimeters, is known as back-face signature. In some embodiments, the article of the present disclosure exhibits a back-face signature of at most about 44 mm, such as at most about 40 mm, at most about 35 mm, at most about 30 mm, at most about 25 mm, at most about 20 mm, at most about 15 mm, at most about 10 mm, at most about 5 mm, at most about 1 mm, about 0 mm, or any range formed from any combination of the foregoing values, when struck with a projectile. In some embodiments, the article of the present disclosure does not exhibit a back-face signature when struck with a projectile.

Figure 2:
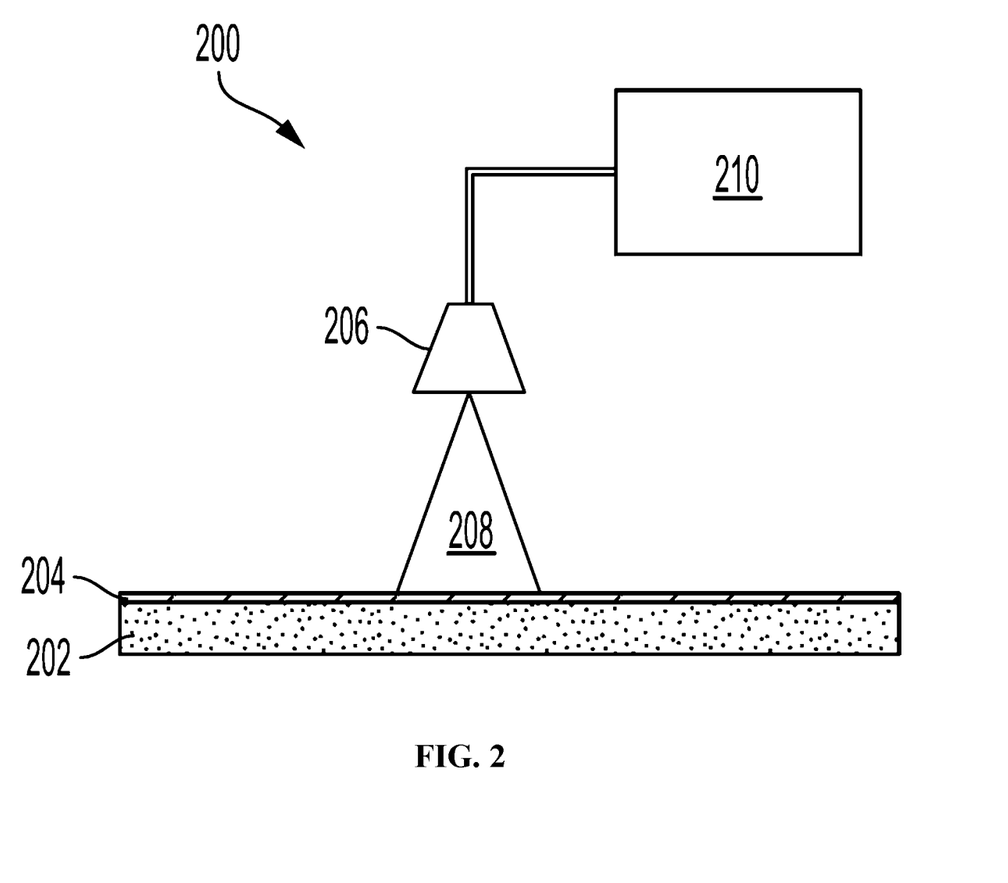
FIG. 2 is an illustrative diagram of coating a polymeric material with nanoparticles, according to an embodiment of the present disclosure.

Also provided herein are methods of forming the article of the present disclosure. FIG. 2 is an illustrative diagram of coating a polymeric material with nanoparticles, according to an embodiment of the present disclosure. A polymeric material 202 is provided and may include polyethylene, ultra-high molecular weight polyethylene (UHMWPE), polypropylene, para-aramid, polyether ether ketone, polyaryletherketone, polyepoxide, or combinations thereof. Nanoparticles 204 are coated onto the surface of the polymeric material 202. The nanoparticles may include carbon nanotubes, graphene, silicon oxide, boron nitride, or combinations thereof. Nanoparticles 204 may be suspended in a solvent and contained in a reservoir 210 and are deposited onto the polymeric material 202 with a dispenser 206. The solvent is not particularly limited and may be selected by one skilled in the art. The dispenser 206 may be a sprayer, a dropper, a printer, or other dispenser known to those skilled in the art. A stream of nanoparticles 208 coats the polymeric material 202.

Figure 3:
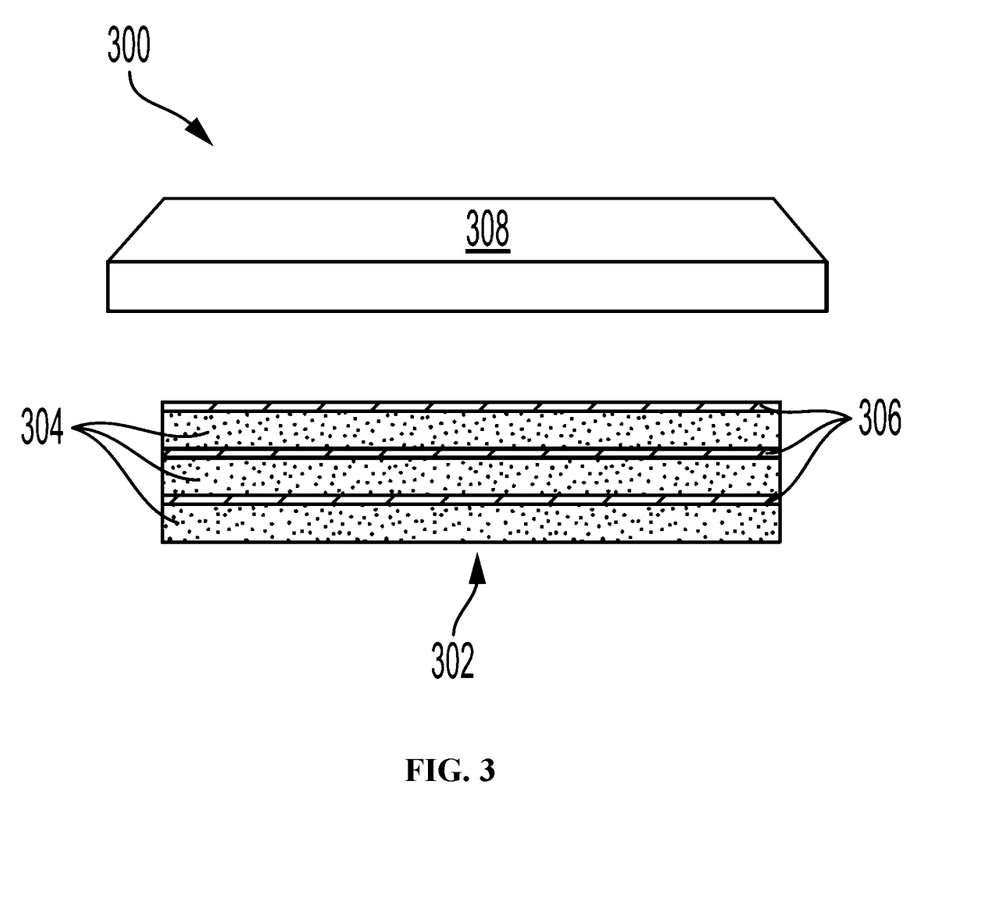
FIG. 3 is an illustrative diagram of treating a coated polymeric sheet, according to an embodiment of the present disclosure.

The composite may be formed from one layer of polymeric material coated with one layer of nanoparticles, or the high strength layer may be formed from multiple layers of polymeric material coated with nanoparticles, according to some embodiments of the present disclosure. In some embodiments, using fewer layers and/or thinner layers may result in a protective apparatus with a lighter weight. In some embodiments, using more layers and/or thicker layers may result in a protective apparatus with a higher strength. FIG. 3 is an illustrative diagram of treating a coated polymeric sheet, according to an embodiment of the present disclosure. FIG. 3 depicts a high strength layer 302 (a composite) which contains multiple layers each of a polymeric material 304 and nanoparticles 306. Each layer of polymeric material 304 and nanoparticles 306 together is considered a coated polymeric sheet. The high strength layer 302 may include about 1 to about 12 layers each of polymeric material 304 and nanoparticles 306, for example one layer, two layers, three layers, four layers, five layers, six layers, seven layers, eight layers, nine layers, ten layers, 11 layers, or 12 layers. The high strength layer 302 may include one layer each of polymeric material 304 and nanoparticles 306, or the high strength layer 302 may include multiple layers of polymeric material 304 and nanoparticles 306 which are stacked on top of each other. The thickness of the high strength layer 302 may be about 1 mm to about 50 mm, for example about 1 mm, about 5 mm, about 10 mm, about 15 mm, about 20 mm, about 25 mm, about 30 mm, about 35 mm, about 40 mm, about 45 mm, about 50 mm, or any range or value contained therein. The thickness of each individual layer of polymeric material and nanoparticles is not particularly limited, so long as the resulting total thickness of the high strength layer 302 is about 1 mm to about 50 mm. As such, in embodiments where more layers of polymeric material and nanoparticles are used, the thickness of the layers of polymeric material and nanoparticles will be relatively smaller than the thickness of the layers of polymeric material and nanoparticles in embodiments where fewer layers are used.

FIG. 3 also depicts a pressing apparatus 308, which presses the layers of polymeric material and nanoparticles to form a composite. The pressing apparatus 308 may press the polymeric material 304 and nanoparticles 306 at a temperature of about 100° C. to about 400° C. For example, the temperature of pressing may be about 100° C., about 150° C., about 200° C., about 250° C., about 300° C., about 350° C., about 400° C., or any range formed from any combination of the foregoing values. The pressing apparatus 308 may press the polymeric material 304 and nanoparticles 306 at a pressure of about 100 bar to about 400 bar. For example, the pressure of pressing may be about 100 bar, about 150 bar, about 200 bar, about 250 bar, about 300 bar, about 350 bar, about 400 bar, or any range formed from any combination of the foregoing values. Pressing the polymeric material 304 and nanoparticles 306 may occur over a time of about 1 hour to about 3 hours, for example about 1 hour, about 1.5 hours, about 2 hours, about 2.5 hours, about 3 hours, or any range formed from any combination of the foregoing values.

Figure 4:
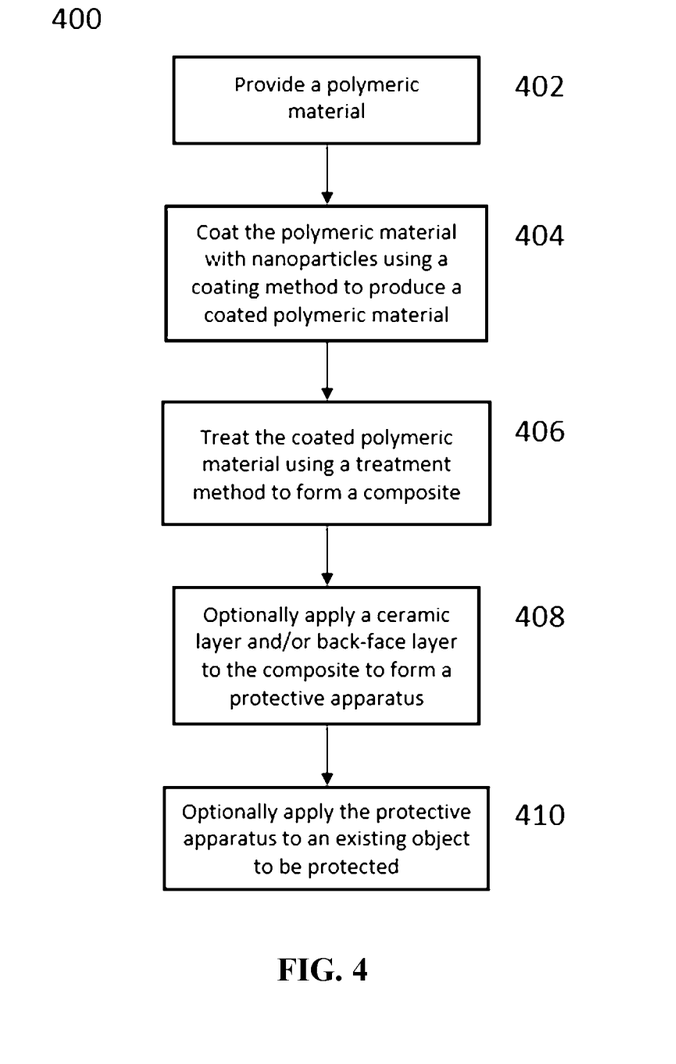
FIG. 4 is a flow diagram of a method of making a protective apparatus according to an embodiment of the present disclosure.

FIG. 4 is a flow diagram of a method of making a protective apparatus according to an embodiment of the present disclosure. The method 400 may include a step of providing 402 a polymeric material. The polymeric material may include polyethylene, ultra-high molecular weight polyethylene (UHMWPE), polypropylene, para-aramid, polyether ether ketone, polyaryletherketone, polyepoxide, or combinations thereof. The method 400 may then include a step of coating 404 the polymeric material with nanoparticles to produce a coated polymeric sheet. The step of coating 404 may include spraying the nanoparticles onto the polymeric material. After the polymeric material is coated, it may be treated, or in some embodiments, a plurality of coated polymeric sheets (of the same or different composition) may be vertically stacked on top of one another. The coated polymeric sheet or the plurality of coated polymeric sheets may be treated. In some embodiments of the present disclosure, the composite includes one coated polymeric sheet and in other embodiments the composite includes a plurality of coated polymeric sheets, such as one sheet, two sheets, three sheets, four sheets, five sheets, six sheets, seven sheets, eight sheets, nine sheets, ten sheets, and so forth. After the polymeric material is coated to form a coated polymeric sheet and optionally stacked, it is treated. The step of treating 406 the coated polymeric sheet using a treatment method to form a composite may include pressing, heating, applying pressure, or combinations thereof. The step of treating 406 the coated polymeric sheet may include pressing the coated polymeric sheet(s) at a temperature of about 100° C. to about 400° C. and a pressure of about 100 bar to about 400 bar for a time of about 1 hour to about 3 hours.

The method 400 may also include optional steps after the composite is formed. The optional step of applying 408 a ceramic layer and/or a back-face layer to the composite may be performed to form a protective apparatus, or the composite alone may be used as a protective apparatus. For example, the method may further include applying a ceramic layer to a front side of the composite. In some embodiments, the method further includes applying a back-face layer to a rear side of the composite. In some embodiments, the method further includes applying a ceramic layer to a front side of the composite and applying a back-face layer to a rear side of the composite. The protective apparatus may be used as body armor, a helmet, a shield, a barrier, or other protective device. The protective apparatus, either the composite alone or the composite with the ceramic layer and back-face layer, may be optionally applied 410 to an existing object, such as a vehicle or air- or watercraft, to protect the existing object.

There is provided an article for a protective apparatus which may include: at least one layer of a polymeric material coated with about 0.1 wt. % to about 10 wt. % of nanoparticles, wherein the article has an areal density of at most about 40.0 kg/m$^2$ and exhibits a back-face signature of at most about 44 mm when struck with a 7.62×51 mm NATO projectile. In some embodiments, the article according to any of the above embodiments has an areal density of at most about 25.0 kg/m$^2$. In some embodiments, the projectile according to any of the above embodiments is a projectile with similar or lower kinetic energy as a 7.62×51 mm NATO projectile.

In some embodiments, the polymeric material according to any of the above embodiments may include polyethylene, ultra-high molecular weight polyethylene, polypropylene, para-aramid, polyether ether ketone, polyaryletherketone, polyepoxide, or combinations thereof. In some embodiments, the nanoparticles according to any of the above embodiments may include carbon nanotubes, graphene, silicon dioxide, boron nitrite, or combinations thereof. In some embodiments, the article according to any of the above embodiments may include multiple layers of a polymer coated with about 0.1 wt. % to about 10 wt. % of nanoparticles.

In some embodiments, the article according to any of the above embodiments is about 5 mm to about 100 mm thick and can have various layers, as described herein. For example, in some embodiments, the article according to any of the above embodiments further may include a ceramic layer. In some embodiments, the article according to any of the above embodiments further may include a back-face layer. In some embodiments, the article according to any of the above embodiments may include both a ceramic layer and a back-face layer. In some embodiments, the article according to any of the above embodiments includes at least one layer of ultra-high molecular weight polyethylene coated with about 0.1 wt. % to about 10 wt. % of carbon nanotubes. In some embodiments, the article according to any of the above embodiments includes at least two layers of a polymer coated with about 0.1 wt. % to about 10 wt. % of nanoparticles. In some embodiments, the article according to any of the above embodiments includes at least five layers of a polymer coated with about 0.1 wt. % to about 10 wt. % of nanoparticles.

There is provided a method for producing a composite for a protective apparatus, which may include steps of: providing a polymeric material, coating the polymeric material with nanoparticles using a coating method to produce a coated polymeric sheet, and treating the coated polymeric sheet using a treatment method to form a composite, wherein the composite has an areal density of at most about 40.0 kg/m$^2$ and exhibits a back-face signature of at most about 44 mm when struck with a 7.62×51 mm NATO projectile. In some embodiments, the composite according to any of the above embodiments has an areal density of at most about 25.0 kg/m$^2$.

In some embodiments, the polymer according to any of the above embodiments may include polyethylene, ultra-high molecular weight polyethylene, polypropylene, para-aramid, (others), or combinations thereof. In some embodiments, the nanoparticles according to any of the above embodiments may include carbon nanotubes, graphene, silicon dioxide, boron nitrite, or combinations thereof. In some embodiments, the coating method according to any of the above embodiments may include spray coating, drop casting, combinations thereof. In some embodiments, the method according to any of the above embodiments includes stacking a plurality of coated polymeric sheets and treating the plurality of coated polymeric sheets using a treatment method to form a composite.

In some embodiments, the treatment method according to any of the above embodiments may include hot pressing the coated polymeric sheet at a temperature of about 100° C. to about 400° C. and a pressure of about 100 bar to about 400 bar. In some embodiments, the treatment method according to any of the above embodiments may include hot pressing the coated polymeric sheet at a temperature of about 100° C. to about 150° C. and a pressure of about 120 bar to about 280 bar.

In some embodiments, the method according to any of the above embodiments further includes applying a ceramic layer to a front side of the composite. In some embodiments, the method according to any of the above embodiments further includes applying a back-face layer to a rear side of the composite. In some embodiments, the method according to any of the above embodiments further includes applying a ceramic layer to a front side of the composite and a back-face layer to a rear side of the composite.

There is provided a method for protecting an object against a ballistic strike, which may include steps of: applying an article to the object, wherein the article includes at least one layer of a polymer coated with 0.1 wt. % to 10 wt. % of nanoparticles, wherein the article has an areal density of at most 40.0 kg/m$^2$.

In some embodiments, the object according to any of the above embodiments may include body armor, protective apparel, a vehicle, a watercraft, an aircraft, a spacecraft, a protective shield or barrier, or combinations thereof.

EXAMPLES

Example 1

Layers of ultra-high molecular weight polyethylene (UHMWPE) were coated with about 0.5 wt. % carbon nanotubes by spray coating to form coated UHMWPE sheets, and 10 layers, that is, 10 sheets, of coated UHMWPE were stacked on top of one another and then hot pressed at a temperature of about 100° ° C. to about 150° C. and a pressure of about 150 to about 275 bar for a time of about two hours to form a composite. The resulting composite was about 10 mm to about 30 mm thick. To this composite was added a layer of boron carbide, silicon carbide, or zirconia as a front-facing high hardness layer and a layer of polyurethane foam as a back-face layer to form a protective apparatus. The area of the protective apparatus was about 0.068 m$^2$. The protective apparatus was tested against 7.62×51 mm NATO rounds to determine the back-face signature. These results are summarized in Table 1.

TABLE 1

| Test | Impact Velocity (m/s) | Ceramic Thickness (mm) | Nanoparticles (wt. %) | Composite Weight (kg) | Weight/Area (kg/m$^2$) | Perforation? | Back-face Signature (mm) |
|---|---|---|---|---|---|---|---|
| 1 | 850.80 | 0 (not included) | 0.5 | 1.49 | 21.9 | No | 41.9 |
| 2 | 842.42 | 2 | 0.5 | 1.66 | 24.4 | No | 37.2 |

As shown in Table 1, the protective apparatus in both samples maintained a back-face signature below 44 mm, as required by NIJ Standard 0101.06 Level III, which is incorporated by reference herein in its entirety. The weights of the protective apparatuses were well below the weight of currently available protective gear of equivalent size, which typically weigh on the order of about 2 kg to about 3 kg. The projectile did not perforate the protective apparatus in either example.

The specific energy absorption of various composites was also evaluated. Table 2 summarizes the specific energy absorption of various composite prepared with five layers of polymeric material coated with nanoparticles (or five layers of polymeric material, in the same of sample 5), with the weight percentage of nanoparticles referring the total amount of nanoparticles relative to the weight of the composite. Specific energy absorption was evaluated using 160 mm by 160 mm samples contacted with a 10 mm hemispherical impactor traveling at an impact velocity of approximately 7 m/s.

TABLE 2

| Sample | Polymeric Material | Nanoparticle Type and Amount | Specific Energy Absorption (J/Kg) |
|---|---|---|---|
| 1 | UHMWPE | 1 wt. % carbon nanotubes | 8463.83 |
| 2 | UHMWPE | 0.5 wt. % carbon nanotubes | 7157.82 |
| 3 | UHMWPE | 1 wt. % graphene | 8368.31 |
| 4 | UHMWPE | 0.5 wt. % graphene | 5574.86 |
| 5 | UHMWPE | None | 4657.50 |

As shown in Table 2, composites which included nanoparticles offered a significant improvement in specific energy absorption relative to the composite which did not include nanoparticles. Samples 1 and 3, which included 1 wt. % carbon nanotubes and 1 wt. % graphene, respectively, offered over an 80% increase in specific energy absorption relative to sample 5, which did not include nanoparticles. Higher specific energy absorption is expected to correlate with improved protective performance and reduced back-face signature when used in a protective article, without wishing to be bound by theory.

This disclosure is not limited to the particular systems, devices and methods described, as these may vary. The terminology used in the description is for the purpose of describing the particular versions or embodiments only and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, the term "about" means plus or minus 10% of the numerical value of the number with which it is being used. For example, "about 50%" means in the range of 45-55% and also includes exactly 50%.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 compounds refers to groups having 1, 2, or 3 compounds. Similarly, a group having 1-5 cells refers to groups having 1, 2, 3, 4, or 5 compounds, and so forth.

Various of the above-disclosed and other features and functions, or alternatives thereof, may be combined into many other different systems or applications. Various presently unforeseen or unanticipated alternatives, modifications, variations, or improvements therein may be subsequently made by those skilled in the art, each of which is also intended to be encompassed by the disclosed embodiments.

What is claimed is:

1. A method for producing a composite for a protective apparatus, comprising steps of:
   providing a polymeric material comprising polyethylene, ultra-high molecular weight polyethylene, polypropylene, para-aramid, polyether ether ketone, polyaryletherketone, polyepoxide, or combinations thereof,
   coating the polymeric material with nanoparticles using a coating method to produce a coated polymeric sheet, wherein the nanoparticles comprise carbon nanotubes, graphene, silicon dioxide, boron nitride, or combinations thereof, and
   treating the coated polymeric sheet using a treatment method to form a composite, wherein the treatment method comprises hot pressing the coated polymeric sheet at a temperature of 100° C. to 400° C. and a pressure of 100 bar to 400 bar,
   wherein the composite has an areal density of at most 40.0 kg/m$^2$ and exhibits a back-face signature of at most 44 mm when struck with a 7.62×51 mm NATO projectile.

2. The method of claim 1, wherein the polymeric material comprises ultra-high molecular weight polyethylene.

3. The method of claim 1, wherein the nanoparticles comprise carbon nanotubes.

4. The method of claim 1, wherein the coating method comprises spray coating, drop casting, or combinations thereof.

5. The method of claim 1, comprising stacking a plurality of coated polymeric sheets and treating the plurality of coated polymeric sheets using a treatment method to form a composite.

6. The method of claim 1, wherein the treatment method comprises hot pressing the coated polymeric sheet at a temperature of 100° C. to 150° C. and a pressure of 120 bar to 280 bar.

7. The method of claim 1, further comprising applying a ceramic layer to a front side of the composite.

8. The method of claim 1, further comprising applying a back-face layer to a rear side of the composite.

9. The method of claim 1, further comprising applying a ceramic layer to a front side of the composite and a back-face layer to a rear side of the composite.

* * * * *